Feb. 3, 1970   R. G. KNIBB   3,493,494
SLUDGE TREATMENT APPARATUS AND METHOD
Original Filed May 18, 1965   2 Sheets-Sheet 1

INVENTOR
ROGER GRAHAM KNIBB
BY
MORGAN, FINNEGAN, DURHAM & PINE
ATTORNEYS

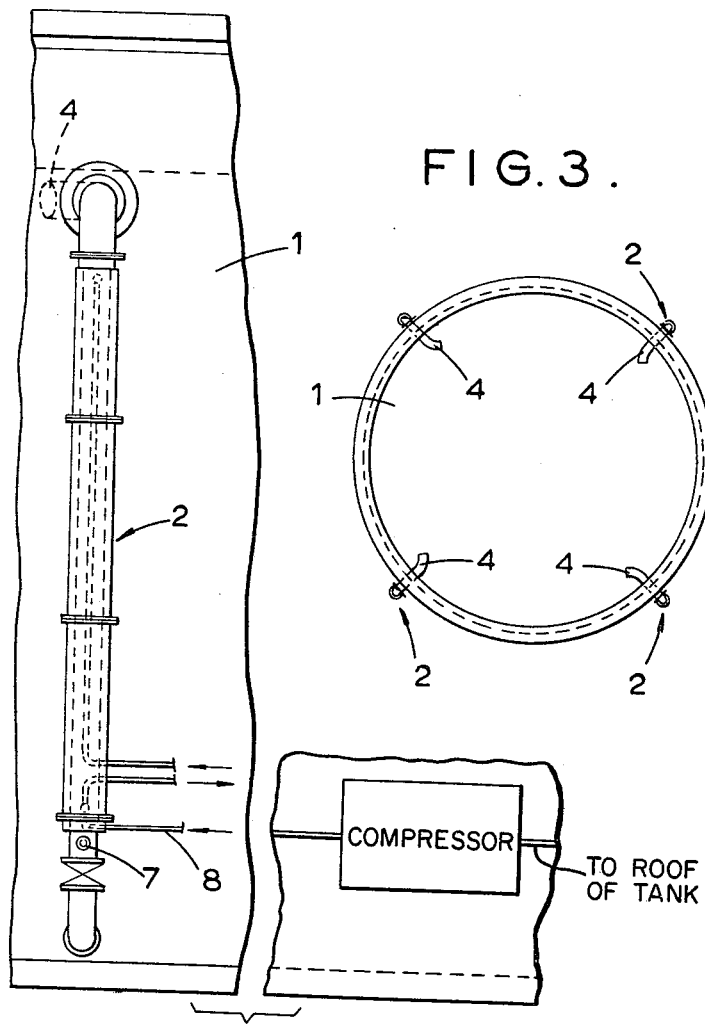
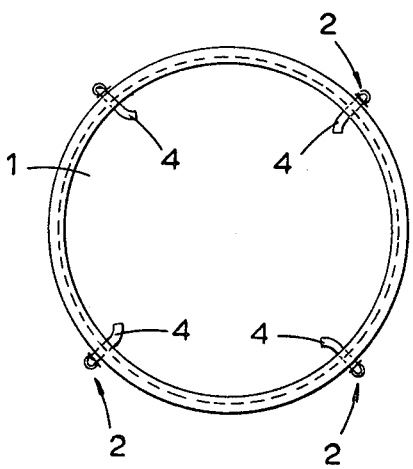

United States Patent Office 3,493,494
Patented Feb. 3, 1970

3,493,494
SLUDGE TREATMENT APPARATUS
AND METHOD
Roger G. Knibb, Hove, Sussex, England, assignor to
Simon-Hartley Limited, a British company
Continuation of application Ser. No. 456,664, May 18,
1965. This application Feb. 5, 1968, Ser. No. 703,184
Int. Cl. C02c 1/06
U.S. Cl. 210—5                                    11 Claims

ABSTRACT OF THE DISCLOSURE

This invention relates to a sewage sludge treatment apparatus comprising one or more units mounted externally of a sludge digester tank for heating and circulating sludge. Each unit comprises piping surrounded by heating means and having a sludge inlet at its lower end and a sludge outlet at its upper end. A conduit is provided for passing a pressurized gas into the piping at or near the lower end for escape at or near the upper end whereby the sludge is caused to circulate from the bottom to the top of the tank through the piping.

---

This application is a continuation of copending application Ser. No. 456,664, filed May 18, 1965, now abandoned.

The invention relates to heaters and circulators for the digester tanks of sewage sludge treatment apparatus.

In the treatment of sewage sludge in a digester tank, four essential operations have to be carried out:

(1) The sludge has to be kept circulating in the tank; this is generally effected by means of a sludge pump provided externally or internally of the tank;

(2) The sludge has to be maintained at a temperature generally about 85° F. throughout the digestion operation; this temperature is generally maintained by means of a heat exchanger, which is also provided outside the tank;

(3) The sludge has to be "seeded," that is to say, the incoming raw sludge admixed with the digesting sludge in order to accelerate the start of digestion of the raw sludge;

(4) The scum which tends to form on the surface has to be broken up; this may be effected by blowing in gas, either from an external source, or from the gas evolved from the sludge during treatment, by means of a compressor which is provided outside the tank.

The invention has among its objects to simplify the method and means for circulating and heating the sludge, specifically by doing away with the use of pumps, avoiding heat losses, and reducing capital and maintenance costs.

A further object is the elimination of any pipe supporting structure within the tank thereby facilitating maintenance and replacement of any faulty or blocked parts of the apparatus.

The invention has further among its objects to provide the circulating and heating means as a series of separate units, each separately mounted so as to be readily adapted for removal, for cleaning, for renewal or repair so that the treatment of the sludge is not stopped if one unit has to be removed.

According to the invention a method of sewage sludge treatment comprises passing a gas under pressure through a conduit into the lower end of piping for escape at or near the upper end, the piping being mounted externally of a sludge digester tank and provided at its lower end with an inlet for sludge from the digester tank and at its upper end with an outlet for the sludge into the digester tank, so that the sludge is caused to circulate through the piping from the bottom to the top of the digester tank, and passing a heating fluid through a jacket surrounding the piping.

Also, in accordance with one embodiment of the invention raw sludge is fed into the lower end of the piping for admixture and circulation with the sludge from the digester tank as sludge moves through said piping, and the roof for the digester tank is floated above the gas under pressure escaping into the tank from the upper end of the piping.

According to the invention furthermore sewage sludge treatment apparatus includes one or more units, mounted, externally of a sludge digester tank, for heating and circulating sludge, each unit consisting of piping having at its lower end an inlet for sludge and, at its upper end, an outlet for sludge at or near the sludge level in the tank, a conduit for passing a gas under pressure into said piping at or near the lower end for escape at or near the upper end, whereby the sludge is caused to circulate from the bottom to the top of the tank through the piping, the piping being formed with a jacket through which a heating fluid is passed for maintaining the sludge at the optimum temperature for treatment.

Thus each unit may consist of sections of steel tube through which the sludge is circulated, the uppermost section of tube being connected to an injection tube positioned to project through the wall of the digester tank, the lowermost section of tube being formed with means for connection with at least one gas inlet fitting adapted for the convenient connection of steel tube of a lesser diameter than the sludge-conveying tube, through which tube gas under pressure is passed, as by means of a compressor.

The compressor may be driven by an electric motor and fed by the gas which collects in the space above the sludge in the tank or from a gas-storage system embodying other similar tanks or gas holders, the gas being compressed and then blown into the sludge-circulating tube.

The sludge-conveying tubes may be formed as jacketed tubes through which a fluid-heating medium such as hot water may be passed to maintain the sludge at the optimum temperature for the digestion operation.

Advantageously glass fibre lagging and aluminium cladding are provided around the main part of each unit.

In addition, a conduit is provided in one embodiment of the invention open to the lower end of said piping which feeds raw sludge thereinto where it is admixed and circulated in said piping with the sludge from the tank. Furthermore, the roof for the tank is adapted to float above the escape of the gas under pressure from the upper end of the piping.

With the present invention, moreover, the outlet of the piping for each of the external units, open at or near the sludge level in the tank, is positioned relative to the tank wall so as to provide a circulating sludge discharge at that level.

The present invention, therefore, provides complete circulation of the sludge in the tank while also providing an efficient system from a performance, maintenance and cost standpoint.

One construction according to the invention is illustrated by way of example in the accompanying drawings in which:

FIGURE 2 is a view in the direction of arrow A of FIGURE 1, and

FIGURE 3 is a plan view of a tank with four units.

Figure 1:
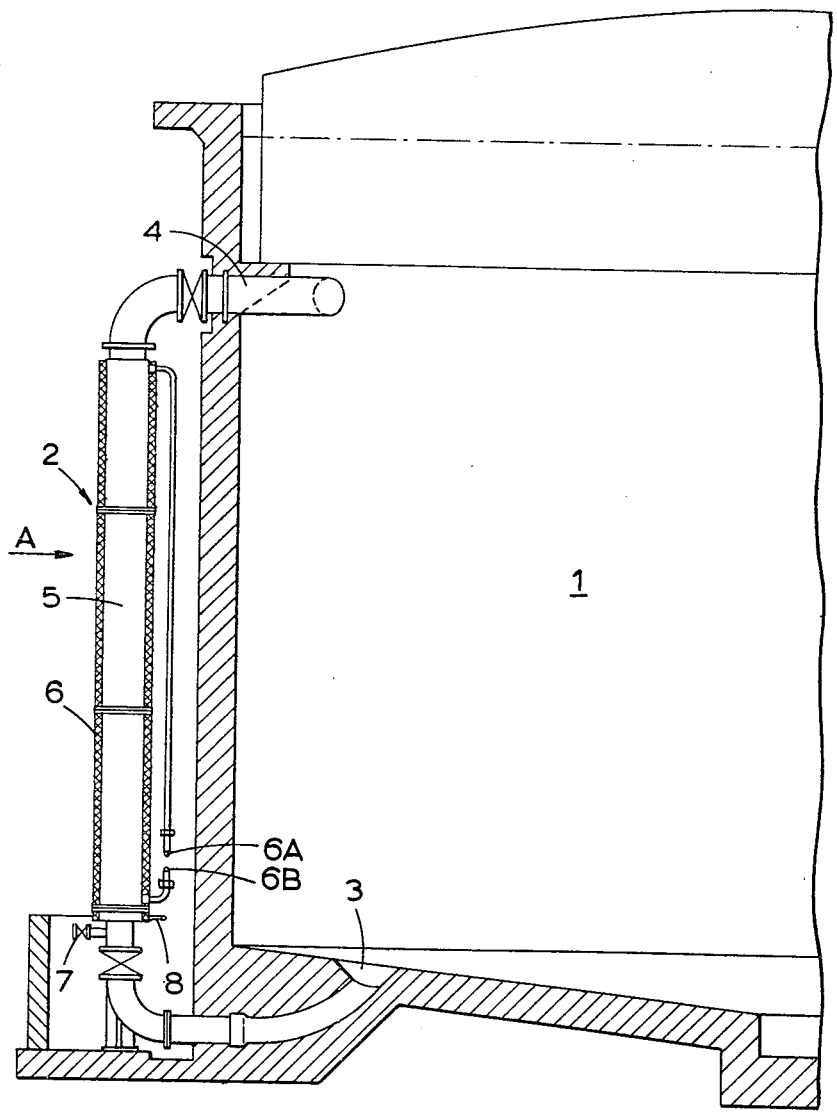
FIGURE 1 is a part section through a digester tank and showing one unit according to the invention.

In the drawings a sludge tank, which may have a floating roof or a fixed roof, and is generally indicated by 1, is illustrated in which four units according to the invention are installed, only one of such units, generally indicated by 2, being shown in the section illustrated in FIGURE 1. The units are mounted externally of the digester tank and are connected to the tank at the bottom of the tank through a circulating-sludge inlet 3 and at or near the top sludge level in the tank through a circulating-sludge discharge by an injection tube 4.

The unit 2 comprises a sludge-carrying tube 5 surrounded by a jacket 6 through which water is circulated via circulating-water feed 6A and circulating-water return 6B and at a temperature sufficient to maintain the sludge at a temperature advantageously at about 85° F. This water temperature may be approximately 150° F. For seeding, incoming raw sludge enters the lower end of tube 5 through a conduit 7. Furthermore, gas under pressure is fed into the lower end of the tube 5 through gas feed 8 to cause the sludge to be circulated from the bottom to the top of the tank through the tube 5.

In operation gas under pressure is pumped through the conduit 8 and hot water is caused to circulate through the jacket 6.

In the construction illustrated the four external units are positioned about the tank at about equal intervals and are each made of three sections of tube each 7'6" long with an internal bore of 16", and an outside tube of 20" bore to give a water jacket annulus approximately 1¾"-section mild-steel plate with flanged joints and water and gas connections.

Each unit is connected at its top end to a 12" bend and 12" injection pipe passing through the concrete wall of the tank and positioned substantially tangential to the digester tank wall to provide a circulating sludge discharge within the digester tank at the sludge level, and at the lower end to a 12" isolating valve, bend, and 12" intake pipe located near the tank floor. One of the lower bends is advantageously fitted with a raw sludge inlet attachment and sluice valve.

The lower end of each unit is fitted with a gas inlet chest allowing gas into the centre sludge tube through an annular slot which may be ¼" wide or wider.

The outside of each of the units is lagged with a 2" thickness of glass fibre insulation protected with a weatherproof cladding of aluminium sheet.

With the practice of the invention, therefore, complete circulation of sludge in the tank is achieved by circulation of sludge from the bottom to the top of the tank through the external sludge carrying tubes or piping, and by circulation of sludge at the sludge level. At the same time, the described external units provide for efficient operation of the system.

What is claimed is:

1. Sewage sludge treatment apparatus comprising: a sludge digester tank having a roof; a plurality of units mounted externally of and substantially equally spaced about said tank for heating and circulating sludge, each unit including piping having at it lower end an inlet which is open to the bottom of said tank and positioned relative thereto so as to withdraw and receive sludge therefrom and having at its upper end an outlet which is open to the top of said tank and positioned tangentially to the tank wall so as to discharge sludge in the vicinity of the sludge level of the tank and to circulate sludge at such level; a conduit for passing gas under pressure into said piping at its lower end for escape at its upper end into said tank in the vicinity of the sludge level so as to cause circulation of sludge from the bottom to the top of the tank through said piping; and a jacket formed about said piping through which heating fluid is passed for maintaining the sludge at the optimum temperature for treatment.

2. The sewage sludge treatment apparatus according to claim 1 in which a conduit open to the lower end of each of said piping is provided for feeding raw sludge thereinto where it is admixed and circulated in said piping with the sludge from the tank.

3. Sludge treatment apparatus according to claim 1 in which said roof of the digester tank is adapted to float above the escape of gas from the piping outlets.

4. Sludge treatment apparatus according to claim 1 in which four of said units are positioned about the tank at about equal intervals.

5. Sewage sludge treatment apparatus according to claim 1 in which each unit consists of sections of steel tube through which the sludge is circulated, the uppermost section of tube being connected to an injection tube positioned to project through the wall of the digester tank, the lowermost section of tube being formed with means for connection with a gas inlet fitting adapted for the convenient connection of steel tube of a lesser diameter than the sludge-conveying tube and means for passing a gas under pressure through the tubes.

6. Sewage sludge treatment apparatus according to claim 5 in which the means for passing the gas under pressure through the tubes comprises a compressor.

7. Sewage disposal treatment apparatus according to claim 6 in which the compressor is fed by the gas which collects in the space above the sludge in the tank, the gas being compressed and then blown into the sludge circulating piping.

8. Sewage sludge treatment apparatus according to claim 1 in which glass fibre lagging and aluminium cladding are provided around the main part of each unit.

9. The method of sewage sludge treatment in a digestive tank comprising: withdrawing sludge from the bottom of the tank through a plurality of substantially equally spaced pipe inlets open to the bottom of the tank for receiving sludge therefrom, wherein the pipes are mounted externally about the tank; maintaining the sludge at the optimum temperature for treatment by passing a heating fluid through jackets about the pipes; discharging sludge from a plurality of substantially equally spaced outlets of said pipes to the top of the tank in the vicinity of the sludge level in the tank, wherein said outlets are positioned substantially tangential relative to said digester tank wall so as to provide a circulating sludge discharge at the sludge level; feeding gas under pressure into the lower ends of the pipes and through the pipe outlets so that sludge is caused to circulate from the bottom to the top of the tank through the pipes; and maintaining a roof for the digester tank above the escape of gas under pressure from the pipe outlets.

10. The method of sewage sludge treatment according to claim 9 comprising: feeding raw sludge into the lower end of each of the pipes for admixture and circulation with the sludge from the digester tank as sludge moves through each of the pipes.

11. The method of sewage sludge treatment according to claim 9 comprising: floating the roof of the digester tank above the escape of gas under pressure from the said pipe outlets.

(References on following page)

References Cited

UNITED STATES PATENTS

| | | |
|---|---|---|
| 2,538,412 | 1/1951 | Cecil et al. |
| 2,638,444 | 5/1953 | Kappe. |
| 2,669,440 | 2/1954 | Lindenbergh. |
| 2,768,137 | 10/1956 | Schlenz et al. |
| 3,056,749 | 10/1962 | Griffith. |
| 3,078,999 | 2/1963 | Kelly. |
| 3,152,982 | 10/1964 | Pagnotti. |
| 3,187,897 | 6/1965 | Walker. |
| 3,220,706 | 11/1965 | Valdespino _____ 210—5 X |
| 3,279,606 | 10/1966 | Cox _____ 210—187 |
| 3,288,295 | 11/1966 | Kelly. |

FOREIGN PATENTS

| | | |
|---|---|---|
| 911,164 | 11/1962 | Great Britain. |

REUBEN FRIEDMAN, Primary Examiner

C. DITLOW, Assistant Examiner

U.S. Cl. X.R.

210—12, 14, 177, 180, 187, 197, 218, 220